May 27, 1930.  R. A. MACKIE  1,760,422
EMERGENCY EXIT FOR VEHICLES
Filed Sept. 24, 1927    2 Sheets-Sheet 1

INVENTOR.
Robert A. Mackie
BY
ATTORNEY

May 27, 1930.  R. A. MACKIE  1,760,422
EMERGENCY EXIT FOR VEHICLES
Filed Sept. 24, 1927   2 Sheets-Sheet 2
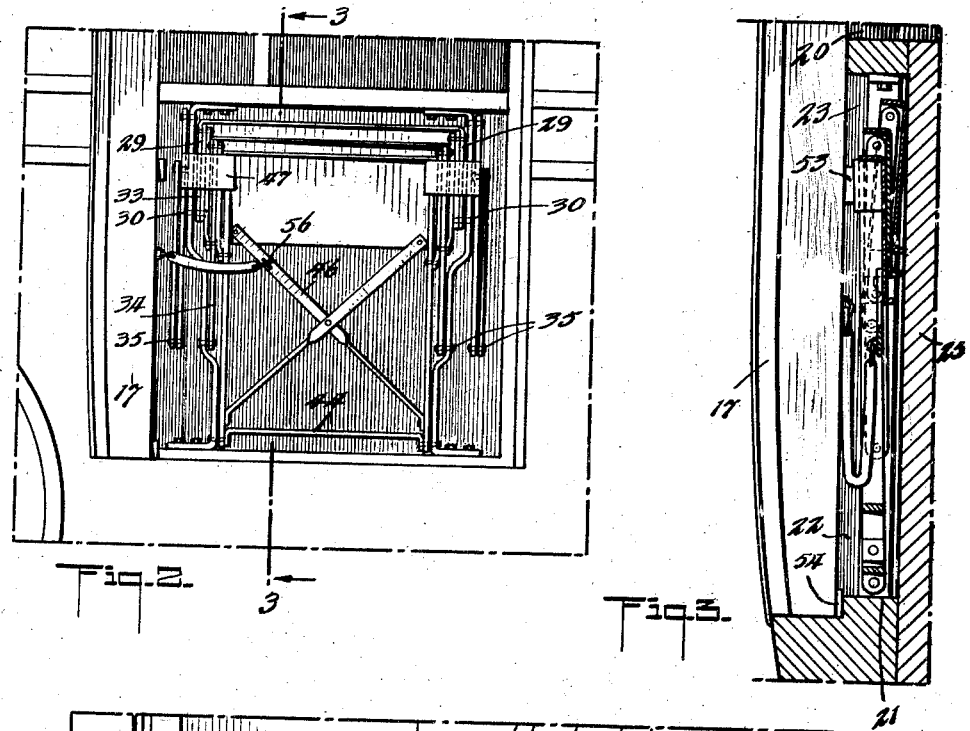
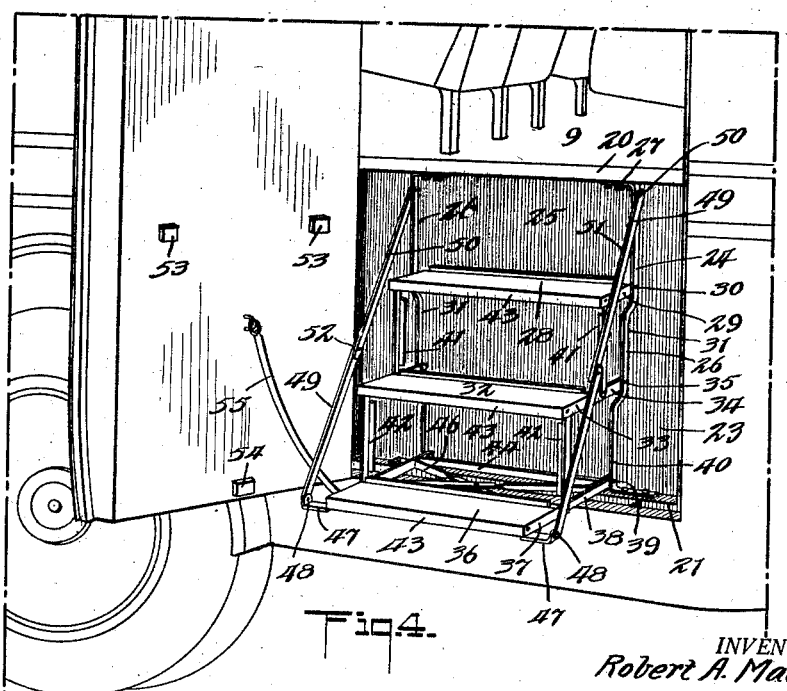
INVENTOR.
Robert A. Mackie
BY
ATTORNEY Patented May 27, 1930

1,760,422

UNITED STATES PATENT OFFICE

ROBERT A. MACKIE, OF DETROIT, MICHIGAN, ASSIGNOR TO AMERICAN CAR AND FOUNDRY MOTORS COMPANY, OF NEW YORK, N. Y., A CORPORATION OF DELAWARE

EMERGENCY EXIT FOR VEHICLES

Application filed September 24, 1927. Serial No. 221,747.

Reference is had to the accompanying drawings which illustrate the preferred form of the invention; though it is to be understood that the invention is not limited to the exact details of construction shown and described, as it is obvious that various modifications thereof within the scope of the claim will occur to persons skilled in the art.

In the drawings:

Fig. 2 is a detail side elevation on slightly larger scale than shown in Fig. 1 of the lower portion of the emergency exit and showing the steps of this invention folded and with the emergency door partly open;

Fig. 3 is a vertical cross section taken approximately on the line 3—3 of Fig. 2; and Fig. 4 is a detail perspective of the lower portion of the emergency exit showing the door fully opened and the folding step structure in unfolded or projected position.

Figure 1:
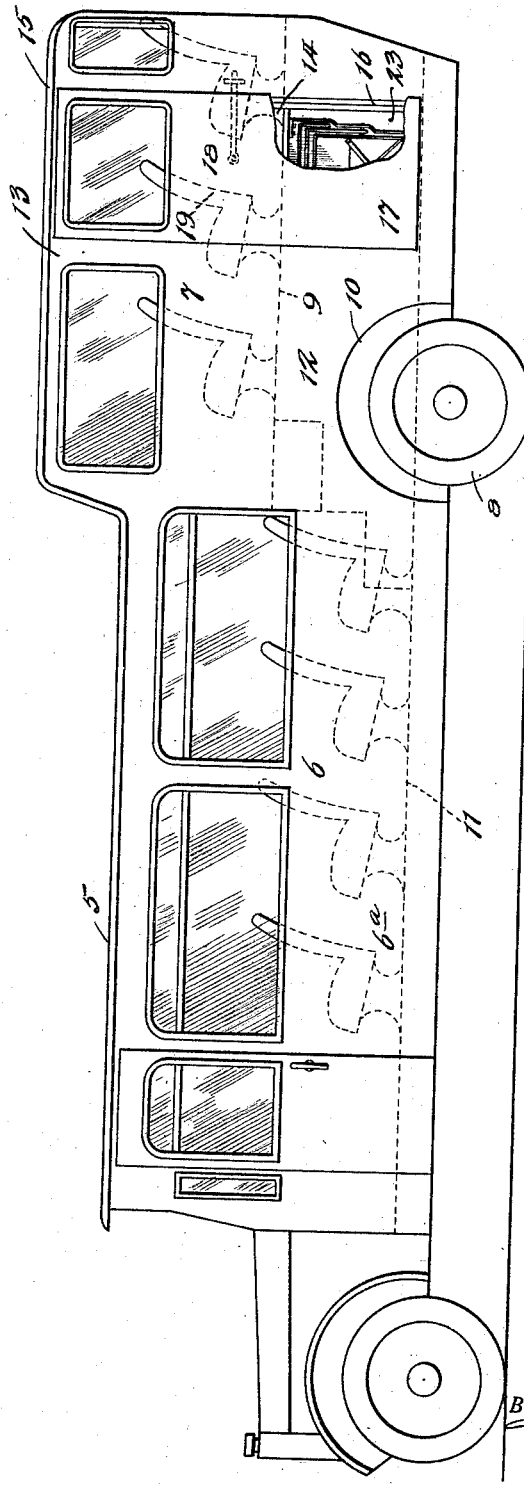
Figure 1 is a side elevation of a known type of motor bus with a portion of the emergency exit door broken away and disclosing the steps of this invention in folded position.

To afford a clear understanding of the object of the present invention, it should be known that in connection with closed and relatively long motor bus bodies emergency exits are usually provided and that such exits are invariably located in the rear portions of the side walls of the bodies. In instances where the construction of the motor bus as a whole is such that the floor level of the body is in the horizontal plane of the wheels, then the distance from the floor to the ground may be such as would not require the presence of an intervening step to facilitate passengers leaving the vehicle via the emergency exit. On the other hand and where the floor is disposed in a plane above the wheels, then the distance between the floor and the ground is increased and the use of one or more intervening steps is necessary to provide a means for descending from the vehicle with safety.

Coming now to the present invention, an object thereof is the provision of a construction in folding steps and a pocket or container therefor, the same being adapted for use wherever folding steps are required and particularly adapted for use in connection with the emergency exit of a motor bus wherein the rear portion of the floor level is disposed above the housings for the rear wheels.

Another object of the invention is the provision of a construction in folding steps wherein the individual treads are foldable one upon the other and into substantially a common vertical plane.

A further object of the invention is the provision of a construction which, when used in connection with the emergency exit of a motor bus, will not prevent the complete closing of the door of said exit.

In the drawings, 5 indicates a motor bus of known construction having a closed body 6 interiorly divided into a forward lower compartment 6ª and an upper rear compartment 7 which is in open communication with compartment 6ª. The forward compartment 6ª is disposed forwardly of the rear wheels 8 and the floor 9 of the rear compartment 7 is disposed above the rear wheel housing shown by 10 in Fig. 1. The floor 11 of forward compartment 6ª extends rearwardly underneath floor 9 and cooperates therewith to provide a baggage compartment 12. The side wall 13 of compartment 7 is provided with a door opening 14 disposed rearwardly of wheel housing 10 and extending vertically upward from the rearward extension of lower floor 11 to a line adjacent to the roof 15 of rear compartment 7. A door frame 16 is secured within opening 14 and carries an emergency door 17 which is arranged to swing horizontally upon hinges (not shown) and is further constructed to fit within the door frame so that the outer surfaces of the door 17 and side wall 13 will be substantially continuous or flush when the door is in closed position as shown in Fig. 1. Door opening 14 is disposed in alinement with one of the transverse aisles 18 between two adjacent transverse seats 19 in rear compartment 7, and the exposed marginal side portion 20 of floor 9 in alinement with the opening 14 extends outwardly so as substantially to abut the inner face of door 17 when the same is in closed position as shown in Figs. 1 and 3. This construction provides for the elimination of undesirable spacing between the door 17 and the floor 9. Within the body, rearwardly of the rear wheels and in such position as to be normally closed by a door 17, is a step well or pocket 23 within which emergency steps hereinafter described are normally retained, the pocket being defined by the marginal portion 20 of the floor 9, the upper edge of side sill 21, the door frame members 22 and a back plate 25 and being normally concealed or closed by the door 17. A folding step structure 24 is adapted to be wholly disposed within pocket 23 when the door 17 is closed and to be confined between the said door and a back plate 25. The folding step structure 24 has oppositely disposed vertically extending side members 26 bolted as at 27 or otherwise fixedly secured to the underface of marginal portion 20 of floor 9 and upper face of sill 21. An upper tread plate 28 (preferably of metal) as viewed in Fig. 4 is provided with depending end flanges 29, the inner end portions of which are pivoted as at 30 to opposite portions of side members 26 and are spaced from the upper ends of members 26 for a distance corresponding substantially to the height of the conventional step. The side members 26 are offset inwardly as at 31 in order to narrow the distance between the said members 26 from points directly below the pivotal connections 30. The long dimension of intermediate tread plate 32 is less than the corresponding dimension of upper tread plate 28 and is made to conform substantially to the distance between the offset portions 31, and the depending end flanges 33 of plate 32 are rigidly secured to the tread plate carriers 34 which are pivoted as at 35 to offset portions 31. Fig. 4 shows the tread plate carriers adapted for supporting tread plate 32 at a distance outwardly and beyond the vertical plane of upper tread plate 28 and the pivotal points 30—35 are spaced for a distance corresponding to the height of the conventional step.

From the foregoing, it is obvious that upper tread plate 28 when turned upwardly and inwardly from the position shown in Fig. 4 is adapted to fit nicely between the upper end portions of side members 26, and intermediate tread plate 32 when turned in a corresponding direction is adapted, by virtue of its shorter length and the lengths of carriers 34, to fold upon plate 28 and nest between the flanges 29 thereof. Lower tread plate 36 is of a length to nicely fit between the flanges 33 of intermediate tread plate 32 when the said plate is turned upwardly and inwardly from the position shown in Fig. 4 to the positions shown in Figs. 2 and 3. End flanges 37 of tread plate 36 are rigidly secured to tread carriers 38 which are pivoted as at 39 to inwardly offset portions 40 of side members 26 disposed below the offset portions 31; the location of the pivotal points 39 and the lengths of carriers 38 being such as will permit of the folding of tread plate 36 from the position shown in Fig. 4 to the positions shown in Figs. 2 and 3. The outer corner portions of upper tread plate 28 are pivotally connected to the upper end portions of riser bars 41 as viewed in Fig. 4 and the lower end portions of said bars 41 are pivotally connected to the intermediate tread plate carriers 33. In like manner, the outer corner portions of intermediate tread plate 32 are connected to the lower tread plate carriers 38 by the riser bars 42. As viewed in Fig. 4, the outer side portions of tread plates 28, 32 and 36 are provided with depending flanges 43 which in conjunction with the end flanges 29, 33 and 37 operate to reinforce the respective tread plates against undue bending under the weight of a person in descending from compartment 7. An additional reinforcement is provided for the lower tread plate structure and is herein shown as comprised of crossbars 44 rigidly secured to the inner end portions of tread carriers 38 and diagonally disposed brace bars 46 secured one to the other as at 45 and further connected to the inner end portions of the tread carriers 38 and the inner corner portions of tread plate 36. The end portions of lower tread plate 36 carry extensions in the form of rigidly secured lugs 47 which are pivotally connected as at 48 to the lower end portions of hangers 49 which slope upwardly and inwardly as viewed in Fig. 4. The upper end portions of the hangers are pivotally connected as at 50 to the upper end portions of the side members 26. Each of the hangers consists of a plurality of substantially symmetrical sections 51 which are connected together by pivots 52 so as to fold, in jack-knife fashion, one alongside the other, when the steps are folded one upon the other as shown in Fig. 2. The folding of the steps from the positions occupied in Fig. 4 to the positions shown in Figs. 2 and 3 is accomplished manually by an upward pull applied to the outer side of lower tread plate 43. When upper tread plate 28 bears on back closure plate 25, door 17 may be completely closed. Door 17 is provided with a plurality of anti-rattle devices herein shown in the form of rubber pads 53 disposed so as to abut the lugs 47 and the rabbeted portion 54 of the sill 21 when the door is completely closed. The door 17 is interiorly provided with a flexible drag 55 which is loosely connected to any suitable portion of the folding step structure as for instance at the portion indicated by 56. When door 17 is closed, the slack of said drag folds into the space between the door and the brace bars 46 as shown in Fig. 3. By virtue of the slack, door 17 is permitted to swing outwardly beyond the path of movement of the step structure before the same is operated by the drag to move outwardly from the position shown in Fig. 2 and gravitate to the position shown in Fig. 4. Door 17 is interiorly provided with a suitable door latch operating device 56 which is accessible from the interior of compartment 7 for the purpose of operating the door 17 to open whenever desired.

What is claimed is:

In a passenger coach having side sills, a plurality of passenger carrying compartments one thereof arranged a substantial distance above the other with the floors of both compartments arranged in spaced relation to provide a baggage compartment, means for permitting egress of passengers from the elevated compartment comprising a step well formed in the baggage compartment between one of the side sills and the floor of the elevated compartment and adjacent the door opening, and steps secured to said sill and said floor and normally arranged in the well and normally concealed by the door, said steps being extensible from the well when the door is open.

In witness whereof I have hereunto set my hand.

ROBERT A. MACKIE.